May 19, 1942.     J. T. HAYWARD     2,283,206
METHOD OF CONTROLLING WELL FLUIDS
Filed April 4, 1938

INVENTOR
J. T. HAYWARD
BY
ATTORNEY

Patented May 19, 1942

2,283,206

UNITED STATES PATENT OFFICE 2,283,206

METHOD OF CONTROLLING WELL FLUIDS

John T. Hayward, Tulsa, Okla.

Application April 4, 1938, Serial No. 199,831

3 Claims. (Cl. 204—181)

This invention relates to methods of controlling the movement of fluids in earth strata and in wells traversing the strata and particularly to electrical methods of controlling the movement between the strata and wells of hydraulic fluids, such as mud fluids commonly employed in the drilling of wells.

Mud fluids serve a number of purposes in the drilling of wells. Among these purposes are: lubrication of the drill bit and tools; washing of the drill cuttings from the well; maintenance of sufficient hydrostatic head of fluid in the well to overcome gas, oil and water pressures which may be encountered; and the plastering and sealing of the wall of the well bore to prevent caving thereof, loss of fluid into the surrounding formations, and escape of undesirable fluids from the formations into the well.

This invention is concerned particularly with the last-mentioned of these various functions of well drilling fluids, namely, the wall-building and sealing properties of the fluids. In the course of drilling wells, particularly by the conventional rotary method, the mud fluid is frequently required to seal-off porous formations to prevent the loss of drilling fluid into the formations, or to prevent the escape of other fluids from the formations into the well. In fulfilling this requirement, use is made of the filtering action of the formations relative to the mud fluid, whereby the clay or earthy particles of the mud are caused to become deposited on the faces of the formations constituting the wall of the well, to form a filter cake, which, under the relatively high pressures exerted against the faces of the formations by the hydrostatic head of the mud fluid, becomes very dense and compact, and when built up to sufficient thickness, resists further flow of hydraulic fluid into the formations, and of formation fluids into the well. This plastering action of the mud fluids on the wall of the well bore may extend from top to bottom of the well and thus effectively seal the wall of the well bore against loss of drilling fluid outwardly into the surrounding formations; prevents caving of material from the wall into the well; and in many cases, prevents entrance of sub-surface fluids into the well.

The last of these effects, namely, the prevention of the entrance of sub-surface fluids into the well, while highly desirable under some circumstances, may be very undesirable under other circumstances, particularly when the sub-surface fluids are the fluids being sought by the drilling operation, that is, the oil or gas. For this reason, it is common practice in many areas, in connection with rotary drilling, to stop the drilling by the rotary method at some distance above the oil or gas producing formation, and to finish the well by means of cable tools. This is a comparatively expensive and time consuming procedure, but is required in present drilling practices, for as noted, if the rotary drilling is continued into the oil or gas producing formation, the mud fluid utilized in the rotary operation will seal off these formations. This is a frequent occurrence in many fields and the source of a great deal of trouble and expense, for once a mud seal has been built up on the face of an oil- or gas-containing formation, it is very difficult to remove the mud seal from the face of the formation.

This invention, among its principal objects, contemplates a method whereby the action of the mud fluid in a well may be controlled to the end that, formations which it is desired to seal, may be more effectively sealed, while those which it is desired to keep unsealed, may be effectively kept free of sealing mud, or the mud seal easily removed after it has been applied.

This invention is based upon a novel method of utilizing the electrical characteristics of the particles of clay or earthy material suspended in ordinary drilling muds. It is known that these particles bear electrical charges, generally negative charges, alnd this invention utilizes this hitherto known but unapplied characteristic to electrically control the movement of the particles in the fluid, in place in the well, to regulate the sealing and wall building properties of the mud fluids, and to control, to some extent at least, the movement of fluids between a well and sub-surface formations traversed by the well.

The method contemplated generally by this invention comprises, establishing an electric field across the interface between the wall of the well bore and the mud fluid in contact therewith, and controlling the direction of the field relative to the charge on the mud particles to cause the mud particles to be attracted or repelled from said interface. By making the wall of the well bore of like polarity relative to the charge on the mud particles, the latter will be repelled from the wall and the wall will remain relatively permeable to the flow of fluids therethrough. By reversing the direction of the electric field and making the wall of the well bore of opposite polarity relative to the mud particles, the latter will be attracted toward the wall and will "plate-out," as it were, on the wall and effectively seal the wall, rendering it relatively impermeable to the flow of fluid therethrough. The movement of the charged mud particles through the mud fluid under the influence of the electric field applied thereto is termed "electro-phoresis."

One method of establishing a suitable electric field across the interface between the wall of the well bore and the mud fluid in contact therewith, consists in immersing an electrode in the mud and spaced from the wall of the well bore, connecting the electrode in circuit with the earth, and flowing direct current from a suitable source through the circuit thus established. The current is conducted between the electrode and the wall of the well bore by the movement of the charged mud particles in a direction depending upon the direction of the flow of the current, the charged mud particles acting similarly to ions of an electrolyte in this respect. Thus, if the mud particles are negatively charged, the usual condition, and the current is caused to flow in a direction which makes the wall of the well bore positive, the mud particles will be attracted thereto, and will deposit thereon, sealing the pores in the wall and rendering it relatively impermeable to the further flow of the mud fluid into the surrounding earth formations, or outwardly from the formations into the well. By reversing the flow of current to make the wall of the well bore of like polarity relative to that of the mud particles, the latter will be repelled from the wall of the bore, which will then become relatively permeable to the flow of fluids therethrough in either direction.

Therefore, a general object of this invention is to provide a method of controlling the flow of fluids in earth strata and in wells.

A principal object is to provide a method of electrically controlling the flow of fluids in earth strata and in wells.

A further object is to provide a method of electrically controlling the wall-sealing action of mud fluids employed in well drilling.

An additional object is to provide a method of controlling the wall-sealing action of mud fluids in wells by subjecting the fluids to an applied electric field, which is directionally controlled to control the direction of movement of the particles of the mud fluids relative to the walls of said wells.

Other objects and advantages of this invention will appear from the following description and drawing.

Figures 1, 2:
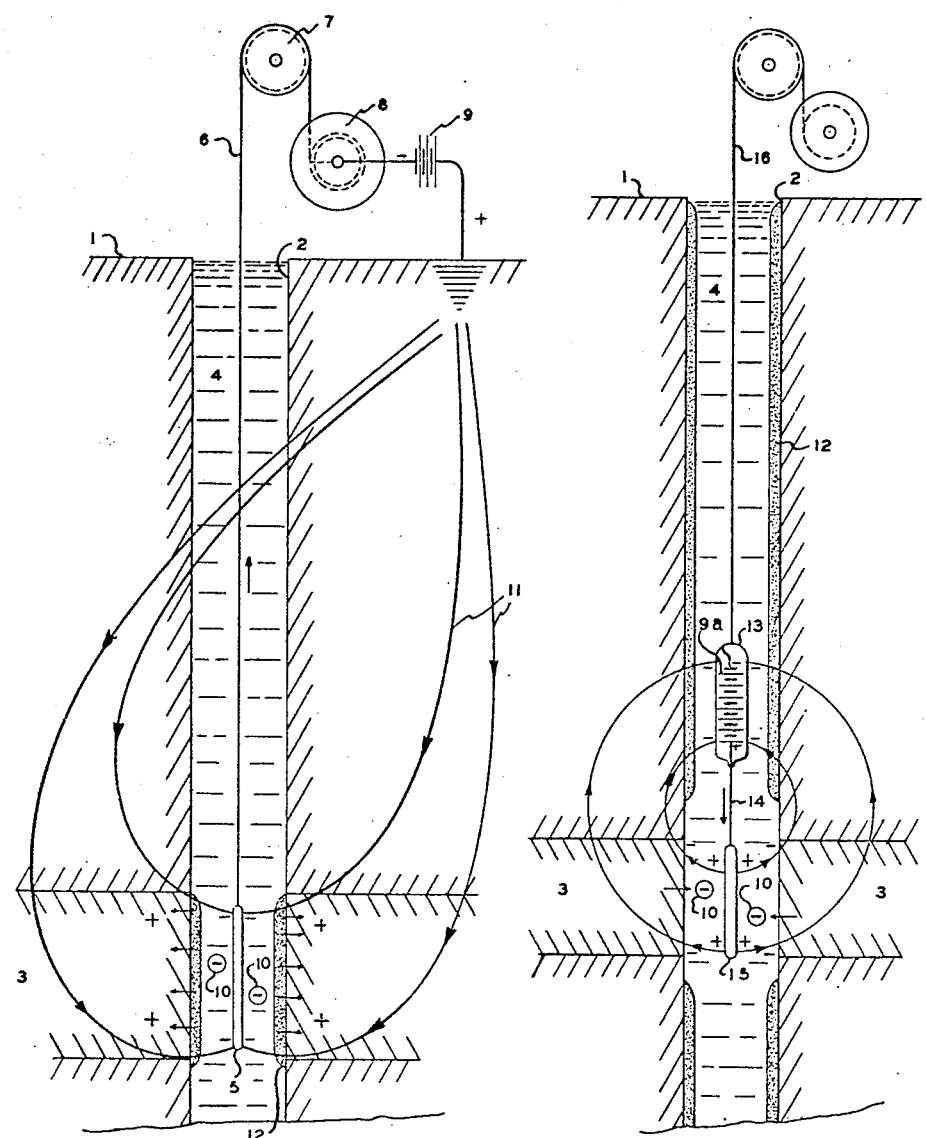
Fig. 1 shows an arrangement of apparatus assembled in a well for establishing an electric field through the earth formations constituting the wall of a well bore and through mud fluid in contact therewith.
Fig. 2 shows a modification of the apparatus of Fig. 1.

Referring to the drawing and to Fig. 1 particularly, a section of the earth 1 is shown having a well bore 2 extending downwardly therethrough and traversing a series of sub-surface strata, including a relatively porous stratum designated by the numeral 3. Well bore 2 is filled with a column of mud fluid 4, which is of the more or less conventional composition commonly used in well drilling by the rotary method. Such fluids ordinarily consist of an aqueous suspending agent, in which is suspended particles of finely ground clay or like earthy material, forming a slurry, which serves the various purposes referred to above in the drilling of wells. Since the present invention is concerned primarily with the wall-sealing or wall-building properties of such mud fluids, none of the other properties will be treated in any detail in this description, although it will be understood that the mud fluids discussed will have, in general, the various other properties desired in such fluids.

An electrode 5, preferably in the form of a cylindrical bar, though not necessarily so, and constructed of a material suitable for conducting electric current, is suspended in the well by means of an insulated cable 6 which makes electrical connection to the electrode. Cable 6 runs over a pulley 7 to a drum 8, on which is wound a quantity of cable 6 sufficient to permit lowering of the electrode to any desired point in the well. The free end of cable 6 is connected through drum 8 to the negative terminal of a direct current source, such as a battery 9, and the positive terminal of battery 9 is connected to ground in the earth 1.

The above described apparatus is employed in the following manner for carrying out the process of this invention: For the purposes of this description, it will be assumed that the clay or earthy particles of the mud fluid 4 are negatively charged, as it is found, in practice, that this is nearly always the case. Some of these particles are shown in the drawing in exaggerated size and are designated by the numeral 10 and are shown positioned opposite the face of stratum 3. Because of the porous nature of stratum 3, it is desired to effectively seal the face thereof which opens into well bore 2 and forms a section of the wall of the well bore. Current is caused to flow from the positive terminal of battery 9 through the earth 1, including stratum 3, to the wall of the well bore and thence through mud fluid 2 to electrode 5 and thence through cable 6 to the negative terminal of battery 9, the current flowing along paths indicated in a general way by the curved lines 11 having arrows thereon to indicate the general direction of current flow. In this manner an electric field is set up across the interface between the wall of well bore 2 and mud fluid 4 in contact therewith, and the direction of the field, controlled by the direction of current flow, is from the wall of the well bore toward electrode 5. Electrode 5 thus becomes a negative electrode, while the wall of the well bore becomes a positive electrode. Since the charge on particles 10 of the mud fluid is negative, then, under the influence of the electric field, these particles, by electro-phoretic action, will be repelled from electrode 5 and will be attracted toward the wall of well bore 2. By placing electrode 5 opposite the face of stratum 3, the electric field which cuts across the face of the stratum will be intensified in this region and the particles 10 of the mud fluid will be deposited on the face of stratum 3 and form thereon a mud seal, designated by numeral 12. The direction of movement of the mud particles is indicated by the short arrows on Fig. 1.

A novel characteristic of the action of the mud particles under the influence of the electric field is that the sealing of the pores of stratum 3 appears to take place substantially instantaneously, and is apparently uninfluenced to any marked extent by the nature of the mud fluid, or of the stratum, or of the pressure differential which may exist across the interface between the mud fluid and the stratum. No particular theory is advanced to explain this novel action, but it is deemed sufficient for the purposes of this disclosure that such action does take place. It appears, from experimental information, that substantially complete sealing of the porous formation takes place before it would be possible, normally, to produce an impermeable mud cake on the face of the stratum by the normal filtering action of the stratum upon the mud fluid under the pressure of the column of mud fluid alone. Further, the fact that the mud fluid may be relatively thin, that is having a relatively low proportion of solids suspended therein, appears to have little material influence upon the rapidity of the sealing action under the influence of the electric field.

If it is desired to remove the mud seal from the face of stratum 3, or some other previously sealed stratum, in order to permit flow of fluids from the stratum into the well bore, or vice-versa, the current through the apparatus is reversed and the mud particles are apparently immediately repelled from the face of the stratum which is now of negative polarity. This action also appears to take almost instantaneously, although once a mud cake of substantial thickness and density has been built up on the face of the stratum, a short period of time may be required to render the mud cake sufficiently permeable to permit a substantial flow of fluid therethrough. During this operation, it may be necessary to reverse the flow of current for very short intervals to discharge mud particles which may deposit on electrode 5, which is now of opposite polarity to that of the mud particles.

When removing previously deposited mud from the wall of a well bore, other conducting fluids, such as salt water, may be introduced into the well in place of the original mud fluid to provide a suitable conducting medium for the passage of the mud removing current.

Another modification of apparatus is shown in Fig. 2, in which the direct current source, such as a battery 9a, is enclosed in a metal casing 13, which is connected to the negative terminal of the battery and thus becomes a negative electrode, while the positive terminal of the battery is insulated from casing 13 and connected by an insulated cable 14 to an electrode 15, similar to electrode 5, which is made the positive electrode of the system. Both casing electrode 13 and electrode 15 are suspended in the well bore 2 by a suspending line such as a wire cable 16 running to the top of the well, and the electrodes are immersed in the mud fluid 4 which fills the well bore. With this arrangement, current will flow from the positive terminal of battery 9a to electrode 15 and thence through mud fluid 4 into and through stratum 3 and the adjacent earth strata to electrode 13, as indicated by the curved lines in Fig. 2. Thus, the face of stratum 3 opposite electrode 15 will be made negative in polarity and will repel the negatively charged particles 10 of the mud fluid, and stratum 3 will be rendered permeable to the flow of fluids. By reversing the battery connections, the direction of the electric field will be reversed to thereby cause particles 10 to be attracted to the face of stratum 3 and effectively seal the same. In both cases, the action of the mud fluid in the section of the well bore opposite electrode 13 will be the opposite of that adjacent electrode 15.

The length of the electrodes may be made substantially equal to the length of the section of the well bore to be treated, or may be of lesser length, in which case, the entire section may be effectively treated by slowly moving the electrode parallel to the face of the section as the current is applied.

While the apparatus illustrated in the figures are more or less diagrammatic representations of apparatus structures which are suitable for practicing this invention, in actual practice, many different forms of apparatus may be utilized, depending upon the nature of the apparatus available and upon the treatment to be applied to the well bore. For example, the conventional hollow drill stem of the usual rotary drill may constitute electrode 5 which is inserted in the well bore. By connecting the current lead to the drill stem and connecting the ground lead to the earth at a suitable distance from the drill stem, an electric field may be set up which will be reasonably uniform in intensity throughout the depth of the well corresponding to the length of the drill stem, and by controlling the direction of the electric field, the entire wall of the well bore may be sealed or kept permeable as desired. Or a section of the drill stem, such as the conventional drill collar and bit may be insulated from the remainder of the drill stem and a current lead connected to this section, which then becomes an electrode for setting up an electric field through the adjacent section of the well bore. Thus the sealing and wall building properties of the mud fluid may be controlled during drilling operations, and the flow of fluids into and out of the well through the adjacent formations effectively controlled.

In another apparatus modification, a drill bit, having a longitudinal opening in the lower end thereof communicating with the conventional hollow interior thereof, may be used. An electrode such as electrode 5 or a pair of electrodes such as electrodes 13 and 15 may be suspended from a cable or line and passed through the interior of the drill stem to any point within the well, the drill stem and bit being drawn upwardly to allow the electrodes to hang in the well below the bit and adjacent the strata to be treated. Such apparatus has been proposed and used in connection with various well surveying methods. It will be evident therefore, that numerous apparatus modifications may be employed to successfully practice the methods of this invention.

As noted above, the action of the mud particles 10, under the influence of the electric fields applied as above described, appears to take place substantially instantaneously and apparently is unaffected to any substantial degree by the pressures on either side of the well bore-mud fluid interface. However, the existence of a fluid pressure differential across the interface in the direction of movement of the mud particles will assist the movement of the particles in that direction, but a fluid pressure differential in the opposite direction, does not, apparently, appreciably influence the movement of the mud particles oppositely thereto. Thus, if the head pressure of the mud fluid on the wall of the well bore exceeds the pressure of fluids within the earth strata being treated, and the current direction is such as to cause the mud particles to deposit on the faces of the strata, this movement may be aided by the existence of the pressure differential in its favor and result in the formation of a more compact mud cake on the wall of the well formed by these strata. On the other hand, under the same pressure conditions, movement of the mud particles away from the wall of the well bore when the current is reversed, is apparently unaffected by this unfavorable pressure differential and the mud cake previously formed appears, almost instantaneously, to become permeable to the flow of fluids therethrough. Similarly, even when the pressure differential favors the flow of fluids from the strata into the well, nevertheless, when the current direction is such as to cause the mud particles to move toward the wall of the well, such movement takes place, and despite the opposing differential pressure, substantially instantaneous sealing of the faces of the strata is effected. When, however, the current is reversed under these pressure conditions and the mud particles caused to move away from the wall of the well bore, thereby rendering permeable the previously formed mud cake, the movement of the fluids in the strata under the influence of the pressure differential will aid in opening the faces of the strata by flushing the mud cake from these faces.

This invention may be applied in still another way. Since the action of the mud particles appears to analogous to that of charged ions in electro-plating systems, the sealing or non-sealing properties of mud fluids may be controlled by chemical control of their composition so as to make the mud particles electro-positive or electro-negative, as the case may be, relative to the wall of the well bore. Thus a difference of potential between the wall of the well bore and the mud particles may be established and the mud particles caused to "plate out" on the wall of the well bore, or to be repelled therefrom, depending upon the direction of the potential gradient, and this action, in some cases, may take place without the application of an externally applied electric field. This action would be analogous to the familiar case of plating copper on zinc by immersing a zinc electrode in a solution of copper sulfate.

The above described methods may be applied to control of conducting fluids, other than mud fluids, in controlling the movement of such fluids into and out of wells and through sub-surface formations. For example, experiments indicate that the flow of salt water through a sub-surface stratum from one well to another, as in the case of water-flooding systems, may be accelerated or retarded by applying electric fields to the stratum between the wells and regulating the direction of the fields to produce the desired action upon the flow of salt water through the formation.

These methods may be applied in still another way to control the preferential "wetting" action of salt water in porous strata containing both oil and salt water. There is considerable experimental evidence to show that in such strata where, for example, the salt water from an intersecting well has been forced into an oil-containing stratum under sufficient pressure to force the oil away from the vicinity of the well, the salt water will have an adsorptive affinity or "wetting" action for the pores of the strata which is sufficiently greater than that of the oil to effectively prevent subsequent dislodgment of the water by the oil even under a large pressure differential normally favoring the movement of the oil toward the well. Under such conditions, by applying an electric field, in one of the above described ways, to the stratum containing oil and water, the salt water may be dislodged from the pores of the stratum and caused to move toward the well, thereby permitting the oil to be discharged from the stratum into the well under the influence of the favoring pressure differential.

Another useful application of this invention, which is indicated by experiments, is in connection with the selective sealing of strata, in cases where both oil and water exist in the same or adjacent strata. When an electric field is applied to a stratum containing water underlying oil, the section of the stratum containing the water will have greater conductivity, that is, lower resistance to current flow, than the section containing the oil. Thus, when mud fluid is introduced into a well which traverses such a stratum, and an electric field applied in one of the ways above described, the mud particles may be caused to deposit selectively upon the face of the water section by proper regulation of the potential of the field, and the water section of the stratum thus sealed, while the oil section remains unsealed.

The amount of current and the voltage required in practicing the above methods will vary widely for each particular case, depending largely upon the nature of the fluids in the wells and strata and upon the nature of the strata and upon various other conditions which may be encountered in each particular case.

An additional useful application of this invention is in connection with the freeing of drilling tools or drill pipe which may become stuck in a well by the settling of the mud particles around them. In such a contingency, by flowing current through the tool in a direction to make the tool of like polarity relative to that of the mud particles surrounding the tool, these mud particles which are in direct contact with the surface of the tool will be effectively repelled, electrically, from the surface of the tool, sufficiently to free the tool, which may then be withdrawn from the well.

What I claim and desire to secure by Letters Patent is:

1. In a well traversing porous earth strata and having therein in contact with said strata a mud fluid containing solid particles bearing electrical charges, the method of sealing said strata which comprises, subjecting said strata and said mud fluid to an electric field, and controlling the direction of said field to make said strata of opposite polarity relative to the sign of the electrical charges on said solid particles to thereby cause said particles to deposit in the pores of said strata.

2. The method of controlling the wall-sealing action of mud fluids in wells which comprises, introducing a mud fluid into a well and into contact with earth strata traversed by the well, said mud fluid containing solid bodies bearing electrical charges, passing direct current through said strata and said fluid, directing the flow of said current in a direction to make the strata of opposite polarity relative to the sign of the electrical charges on said solid bodies to thereby cause said bodies to be deposited on said strata.

3. In the process of building a mud sheath on the wall of a well, the steps of maintaining an electrolytically non-conductive fluid containing clay particles in the well, immersing therein an electrode insulated from the ground, and maintaining said electrode at a sufficiently high negative potential with regard to the mud sheath to produce a cataphoretic effect on the clay particles of the fluid whereby said sheath is built up in thickness by electrodeposition of the clay particles.

JOHN T. HAYWARD.